(12) United States Patent
Aalst

(10) Patent No.: US 6,182,402 B1
(45) Date of Patent: Feb. 6, 2001

(54) CONFINEMENT-CELL WINDOW ATTACHMENT

(76) Inventor: Duco Van Aalst, 2762 Hyannis Way, Sacramento, CA (US) 95827

( * ) Notice: Under 35 U.S.C. 154(b), the term of this patent shall be extended for 0 days.

(21) Appl. No.: 09/111,924

(22) Filed: Jul. 8, 1998

(51) Int. Cl.[7] .................................................. E04H 3/08
(52) U.S. Cl. .................. 52/106; 52/79.9; 52/202; 52/127.7; 52/213; 49/15; 49/57; 49/171
(58) Field of Search ................ 49/171, 15, 57, 49/169, 50; 52/106, 79.9, 202, 127.5, 127.7, 204.1, 213

(56) References Cited

U.S. PATENT DOCUMENTS

| | | | |
|---|---|---|---|
| 1,747,156 | * 2/1930 | Breslow | 49/171 |
| 2,259,751 | * 10/1941 | Kelley, Jr. | 52/106 |
| 2,638,810 | * 5/1953 | Berleme | 49/171 |
| 2,771,971 | * 11/1956 | Goldberg | 52/204 |
| 3,173,180 | * 3/1965 | Dean | 52/204 |
| 3,203,052 | * 8/1965 | Curtis, Jr. | 49/171 X |
| 3,944,336 | * 3/1976 | Carr, Jr. | 350/174 |
| 4,555,991 | * 12/1985 | Bellezza | 109/9 |
| 4,571,901 | * 2/1986 | Morris et al. | 52/106 |
| 4,719,720 | * 1/1988 | Olsen | 49/171 |
| 4,763,444 | * 8/1988 | Ritchie | 49/171 |
| 4,838,001 | * 6/1989 | Battles | 52/456 |
| 4,869,021 | * 9/1989 | Gregory | 49/171 |
| 4,964,711 | * 10/1990 | Degnan | 359/503 |
| 4,992,866 | * 2/1991 | Morgan | 348/159 |
| 4,993,187 | * 2/1991 | Schweiss et al. | 49/56 |
| 5,953,052 | * 9/1999 | McNelley et al. | 348/20 |

\* cited by examiner

Primary Examiner—Christopher T. Kent
Assistant Examiner—Jennifer I. Thissell
(74) Attorney, Agent, or Firm—Risto A. Rinne, Jr.

(57) ABSTRACT

An apparatus for the viewing of an inmate in a cell while preventing the inmate from determining if he is being observed includes a frame enclosure with means for securing the apparatus about a cell window attached to the frame structure. A two-way mirror is attached to the frame enclosure and disposed proximate the cell window. A sheet of light attenuating material is disposed in the frame enclosure in planar alignment with respect to the two-way mirror a predetermined distance therefrom to darken the area intermediate the two-way mirror and the sheet of light attenuation material. Means for viewing through the two-way mirror are provided which include a lens or a video camera and display. An optional slot allows for manual positioning of the lens to permit optimum viewing into the cell. The means for securing includes a plurality of magnets disposed around the perimeter of the frame enclosure or by use of a hook and loop fastener. At least one handle is attached to the frame enclosure and is useful to move the apparatus from a first cell window to a second cell window, as may be necessary.

17 Claims, 2 Drawing Sheets

CONFINEMENT-CELL WINDOW ATTACHMENT

BACKGROUND OF THE INVENTION

1. Field of the Invention

The present invention, in general relates to window coverings and, more particularly, to devices that attach to confinement-cell windows.

People may be confined for many reasons. They may be held in many different types of locations. Sometimes a person may be placed in a local, county, or Federal jail or prison cell, when such is warranted.

Whether a person was recently arrested, or has long been incarcerated, there is an unknown element regarding their behavior while they are confined. For example, they may fabricate a weapon, such as a stabbing instrument, from something in their cell.

They may be alone or they may share cell space with another person. They may pose a risk to themselves or to the other person. They may have acute mental illness that can flare at any time. They may be in an altered state of consciousness as can be induced from consuming any of a wide variety of drugs during which they behave inappropriately.

It is the responsibility of those who work at such establishments (police, sheriff, deputies, agents, etc.) to ensure the safety of the prisoner and also of other inmates who may be sharing the same cell space. When inappropriate behavior is believed to be occurring in a cell, those who work in such places must verify if this is indeed happening and then take necessary steps to ensure the safety of the prisoner and of the other inmates. They must do this using the least amount of force that is required. To do otherwise invites potentially expensive lawsuits.

Each cell typically has a small window attached to a steel door leading into the cell. When a particular person or persons in a cell is believed to be likely to cause problem behavior, the window is typically covered (with an opaque covering) that is taped to the window at the exterior of the door. This is to prevent the inmate from knowing when a "team" of workers are about to enter into the cell.

Where there are cells holding people in confinement it is inevitable that emergency entry into the cells will occasionally be required. Most jails have teams of people ready to quickly enter into a cell. A common name for such types of teams is "Custody Emergency Response Team" or the acronym "CERT".

The CERT team (hereinafter "team") would typically enter the cell and subdue the inmate. If the inmate is under the influence of certain drugs, he might have several times his normal strength thereby requiring several team members to physically restrain and overpower him. He might then be further restrained such as by confinement to a chair or otherwise controlled, such as by isolation or special restraint devices.

However, if the inmate sees members of the team outside of the door, he might behave irrationally, such as by inflicting harm to himself or to another person. If he had fashioned a stabbing instrument from some object in his cell, it can be appreciated how volatile such a situation could be.

The team, ideally, must enter the cell using the element of surprise. This is the most likely approach to prevent further injury from occurring. But it also causes a serious problem. If the door window is occluded, the team members do not know the status of the occupants in the cell. A violent inmate might be standing beside the cell door with a stabbing instrument ready to inflict harm to the first person to open the door.

It is therefore important for the team members to know the status in the cell before they enter without alerting the inmate that they are about to enter, so as to avoid exacerbating the situation.

Typically under such circumstances, one team member carries a video camera to video-tape entry into the cell and the steps taken by the other workers to subdue the inmate. This is done so as to obtain evidence of the reasonable use of force, thereby preventing the filing of future lawsuits.

Such video-taping cannot occur until the cell door has been opened. It would be advantageous to begin video-taping of the cell environment prior to entry so that justification for the entry can be demonstrated, again for purposes of demonstrating reasonable and responsible actions by those people who are held responsible for the well being of the inmates.

Also, while it is advantageous for even one of the workers to ascertain cell status prior to entry (as he can communicate this to others), it is especially desirable for all of the workers to have this awareness. This is because conditions in the cell can change quickly and so a rapid response is often required. In other words, sometimes there might not be sufficient time available to brief all of the remaining team members prior to entry.

One might think that a simple two-way mirror provides a complete solution. It does not. Two-way mirrors require at least a five to one differential in brightness to work. In other words, ideally it must be about five times brighter in the cell than outside for a two-way mirror to work. While this condition can readily be created in special interrogation rooms, it rarely is the situation in places of confinement.

Aside from special lighting considerations, two-way mirrors are expensive. It simply is impractical to consider using them for all of the cell windows. Furthermore, if the inmate is behaving in an acceptable fashion it is desirable to allow him or her to look out through the cell window. Only when dealing with a problem inmate is it necessary to occlude his vision from the cell while permitting those responsible for his well being to monitor him from outside the cell.

Accordingly there exists today a need for a Confinement-Cell Window Attachment that is detachably attachable about a cell window and which allows for ascertaining of the status within a cell without alerting an inmate as to when he is being monitored.

Clearly, such an apparatus is a useful and desirable device.

2. Description of Prior Art

Special windows are, in general, known. For example, the use of two-way mirrors is well known. Certain window treatments are also known such as blinds or window shades.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a confinement-cell window attachment that is easy to use.

It is also an important object of the invention to provide a confinement-cell window attachment that is easy to manufacture.

Another object of the invention is to provide a confinement-cell window attachment that permits surveillance of an inmate.

Still another object of the invention is to provide a confinement-cell window attachment that prevents an inmate from knowing that he is being observed.

Still yet another object of the invention is to provide a confinement-cell window attachment that can be used with a lens.

Yet another important object of the invention is to provide a confinement-cell window attachment that can be used with a video-camera.

Still yet another important object of the invention is to provide a confinement-cell window attachment that is attachably detachable to a cell window.

Still yet another further important object of the invention is to provide a confinement-cell window attachment that is attached magnetically about a cell window.

Still yet one additional important object of the invention is to provide a confinement-cell window attachment that is attached about a cell window by a hook and loop fastener.

Still yet another further very important object of the invention is to provide a method for constructing a confinement-cell window that simulates a lower light level on one side thereof for use with a two-way mirror.

Briefly, a viewing apparatus to permit viewing into a cell by personnel responsible for monitoring an occupant therein and prevent the occupant from knowing that he is being monitored for use with a cell window that is constructed in accordance with the principles of the present invention has a rectangular frame enclosure, preferably of a non-ferrous material, and at least one magnet attached thereto useful for securing the frame enclosure to a steel (ferrous) frame as typically surrounds the cell window. According to a first alternate embodiment, a first half of a hook and loop type of fastener is attached to the frame and a second half of a hook and loop type of fastener is attached to the cell door, for which embodiment the frame enclosure may be ferrous if desired. A two-way mirror is attached to the frame enclosure and is disposed proximate the cell window. An opaque layer is disposed a predetermined distance from the two-way mirror to create a substantially lower light level on the side of the two-way mirror that is opposite the cell window. A lens is disposed through an opening provided in the opaque layer for viewing of the situation in the cell through the two-way mirror. According to a second alternate embodiment, the lens includes a video camera. A display of the image seen by the video camera is attached to the viewing apparatus so that the situation in the cell can be seen by a plurality of people before entering therein.

DETAILED DESCRIPTION OF THE INVENTION

Figure 1:
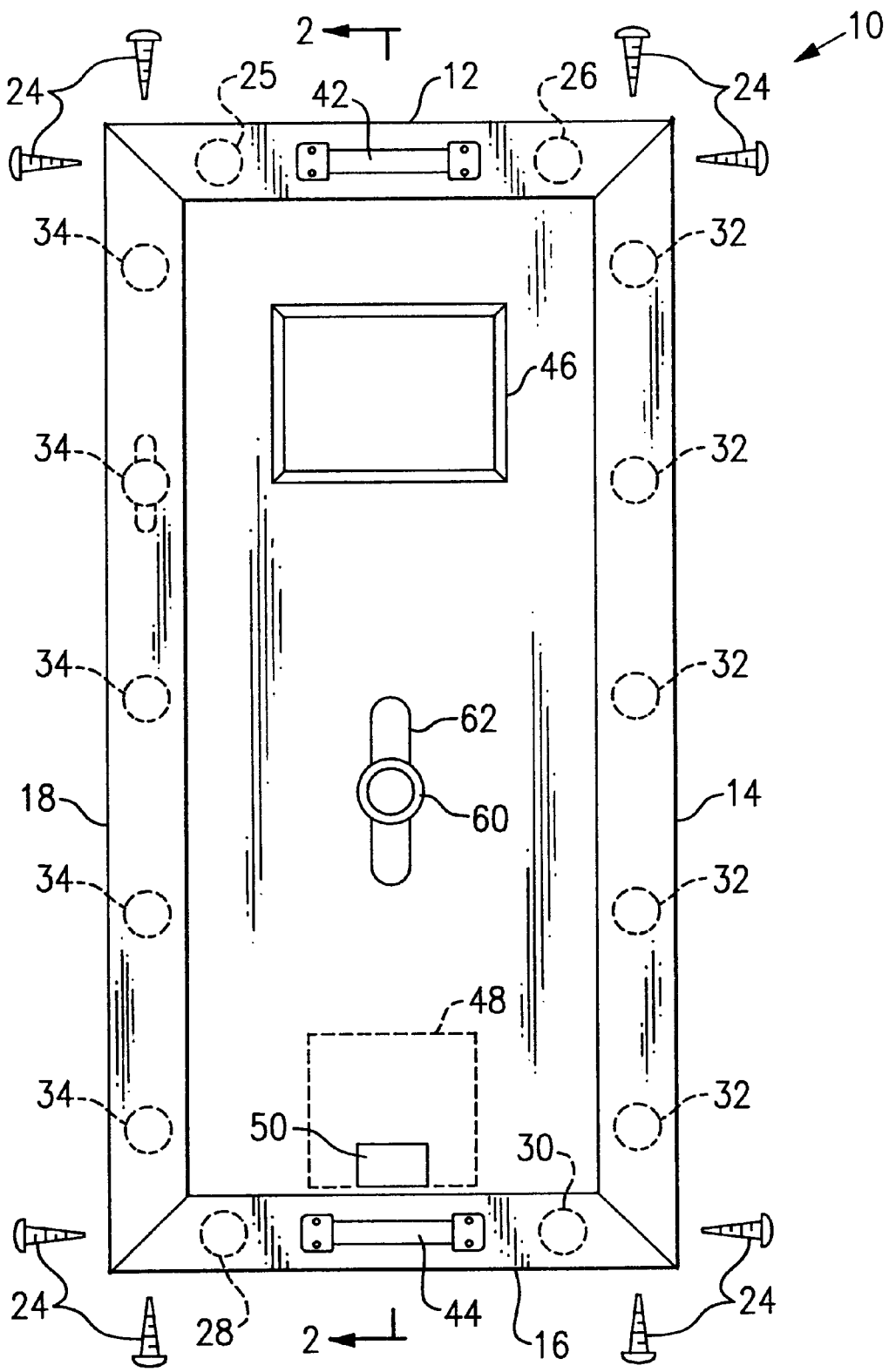
FIG. 1 is a plan view of a confinement-cell window attachment with screw fasteners shown in an "exploded" view.
Figure 2:
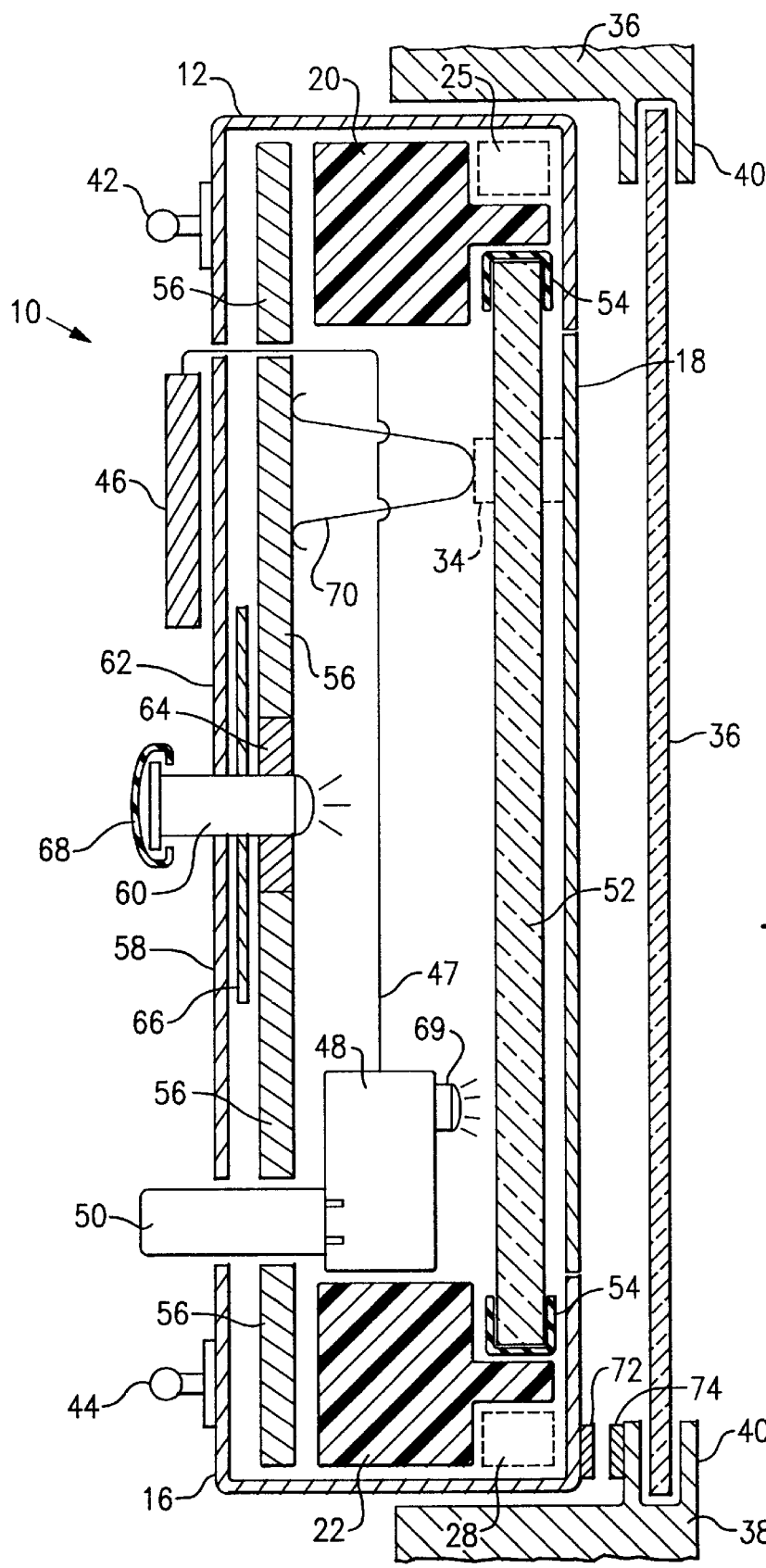
FIG. 2 is a cross sectional view taken on the line 2—2 in FIG. 1 with the confinement-cell window attachment disposed in a prison cell steel door frame and window, also shown in cross sectional view, and also revealing a first and a second alternate embodiment of the invention.

Referring to FIG. 1 and to FIG. 2 is shown, a confinement-cell window attachment, identified in general by the reference numeral 10.

A frame enclosure includes a top frame member 12, a first side frame member 14, a bottom frame member 16, and a second side frame member 18. Each of the frame members 12–18 is preferably made of a non-ferrous material (to permit magnetic flux to pass through them as is described in greater detail hereinafter) and of a U-shaped material stock, such as aluminum channel stock.

An upper block 20 and a lower block 22 extend intermediate the first and second side frame members 14, 18. The upper and lower blocks 20, 22 are formed of wood or any other material as desired, such as plastic. A plurality of screws 24 pass through the frame members 12–18 securing them to either of the upper and lower blocks 20, 22 to form the frame enclosure.

A first top magnet 25, a second top magnet 26, a first bottom magnet 28, a second bottom magnet 30 and five first side magnets 32 and five second side magnets 34 are disposed around the frame enclosure proximate a side thereof that is disposed nearest a cell window 36.

The cell window 36 is disposed in a cell door 38 that is typically made of steel. A steel window frame 40 is attached to the cell door 38 and surrounds the cell window 36, thus securing it in position.

An upper handle 42 is attached to the top frame member 12 and a lower handle 44 is attached to the bottom frame member 16. The upper and lower handles 42, 44 are useful for moving the confinement-cell window attachment 10 from cell to cell (not shown) as necessary. Although it is not shown, if desired, additional of the screws 24 may be used to secure the upper and lower handles 42, 44 to the top and bottom frame members 12, 16 and also to the upper and lower blocks 20, 22.

If desired, removal of the screws 24 allows for the disassembly of the confinement-cell window attachment 10 and access to all of the internal component parts (as are described hereinbefore and hereinafter) for service or replacement thereof.

A display 46 is included as an option and is electrically connected by an electrical cable 47 to a video camera 48, that is also optionally included as part of the confinement-cell window attachment 10, according to a second alternate embodiment (A first alternate embodiment discussed briefly hereinbefore relates to the use of a hook and loop fastener and is discussed in greater detail hereinafter.). A battery 50 plugs into the video camera 48 and is preferably accessible from the side of the confinement-cell window attachment 10 that is furthest from the cell window 36.

A two-way mirror 52 is disposed in the frame enclosure intermediate the upper and lower blocks 20, 22 and is protected by a rubber strip 54 that placed intermediate the two-way mirror 52 and each of the upper and lower blocks 20, 22.

An opaque sheet 56 is disposed in the frame enclosure at a side opposite where the two-way mirror 52 is disposed. The opaque sheet 56 limits the amount of visible light that is allowed to enter into the space within the frame enclosure. Ideally, the opaque sheet 56 is indeed nearly opaque thus allowing virtually no light to enter.

It is necessary to darken the side of the two-way mirror 52 that is opposite that facing the cell window 36 in order to create a condition of it being much brighter on the cell side of the two-way mirror than on the side nearest the opaque sheet 56. This permits viewing through the two-way mirror 52 into the cell while preventing an inmate (not shown) in the cell from being able to see through the two-way mirror 52.

To him, it appears as a mirror and he is unaware that people on the outside can monitor his activities. Even if he were so aware he would not know when monitoring of him is occurring. As certain inmates may experience exacerbated inappropriate behavior if they know that they are being observed, it is important to be able to monitor their activity without their knowing that it is occurring.

A cover sheet 58 fits on top of the opaque sheet 56 and intermediate the frame members 12–18. The cover sheet 58 is preferably formed of the same material as the frame members 12–18 and so provides a neat looking appearance to the confinement-cell window attachment 10 when it is completely assembled.

A viewing lens 60 is disposed in a first slot 62 that is formed in the cover sheet 58 and also in a second slot 64 that is formed in the opaque sheet 56. The first and second slots 62, 64 are disposed so that the first slot is on top of the second slot 64.

An intermediate sheet 66 surrounds the viewing lens 60 and is disposed intermediate the cover sheet 58 and the opaque sheet 56. The intermediate sheet 66 is also substantially opaque and adapted to slide in planar alignment intermediate the cover sheet 58 and the opaque sheet 56 as the viewing lens 60 is moved up and down in the slots 62, 64.

If desired, the slots 62, 64 may be omitted as well as the intermediate sheet 66 and replaced by a simple aperture through both the cover and opaque sheets 58, 56 for the viewing lens 60 to pass through. The advantage the slots 62, 64 provide is greater flexibility to monitor the inmate if he, for example, has placed an obstruction (not shown) over the cell window 36 which occludes a portion of it. It may be possible to slide the viewing lens 60 within the slots 62, 64 to a position past the obstruction.

A rubber eyepiece cover 68 slips over the exterior most portion of the viewing lens 60 to protect it from dust or damage when not in use. To use the viewing lens 60, the rubber eyepiece cover 68 is removed and an observer (not shown) peers through the viewing lens 60.

The video camera 48 includes a video camera lens 69 that is similarly disposed so as to gather light that is coming from the cell passing through the cell window 36 and also through the two-way mirror 52. The video camera 48 includes internally a video tape recorder mechanism (such as 8 mm video) as is well known in the arts to record the images as pass through the video camera lens 69.

The video camera 48 is set to turn on and begin both recording images and also presenting them on the display 46 the moment the battery 50 is inserted. If desired, a separate on-off switch (not shown) and a separate record-stop switch (not shown) can be used to activate the video camera 48.

A first spring 70 extends from the opaque sheet 56 and applies a force to one of the five second side magnets 34. The first spring 70 supplies a force which tends to urge the opaque sheet 56 generally away from the two-way mirror 52 and one of the five second side magnets 34 into position against the side of the second side frame member 18 that is closest to the two-way mirror 52.

Additional springs (not shown) similarly secure the remaining four of the second side magnets 34 as well as the five first side magnets 32 against the first side frame member 14. of course, the size, type, and number of magnets may be varied to create whatever type of adhesion is desired by varying the density of magnetic flux passing through the frame members 12–18.

According to a first alternate embodiment, a first half of a hook and loop fastener 72, such as is marketed under the trade name VELCRO is attached where desired to the outside perimeter of the frame members 12–18. A second half of a hook and loop fastener 74 is attached where desired to the steel window frame 40 so as to correspond with the locations of the first half of a hook and loop fastener 72 when the confinement-cell window attachment 10 is placed in position adjacent to the cell window 36. The first and second halves of a hook and loop fastener 72, 74 are attached by the use of an adhesive, as is well known.

Operation:

The magnets 25, 26, 28, 30, 32, 34 secure the confinement-cell window attachment 10 in a position of cooperation about the cell window 36 whenever it is placed there. To remove the confinement-cell window attachment 10, the upper and lower handles 42, 44 are grasped and the confinement-cell window attachment 10 is pulled away from a position of cooperation with the cell window 36, thereby releasing the grip maintained by the magnets 25, 26, 28, 30, 32, 34.

According to the first alternate embodiment, the first and second halves of the hook and loop fastener 72, 74 secure the confinement-cell window attachment 10 when it is placed in position. To remove the confinement-cell window attachment 10, the upper and lower handles 42, 44 are grasped and the confinement-cell window attachment 10 is pulled away from a position of cooperation with the cell window 36, thereby releasing the grip maintained by the first and second halves of the hook and loop fastener 72, 74.

When the confinement-cell window attachment 10 is in position about the cell window 36, the inmate is unable to see out of the cell window 36. The confinement-cell window attachment 10 appears to him to have a mirror finish. The viewing lens 60 or the video camera lens 69 are not visible from inside of the cell.

The observer normally removes the rubber eyepiece cover 68 and determines whether entry into the cell is warranted. If it is, he is able to ascertain the location of the inmate and in general, the status in the cell. Thus if entry is required, he will be better prepared to respond to the situation. The inmate will not know that the observer is present outside of the cell nor will he know when he is being observed. This helps to prevent an escalation of the situation.

If the slots 62, 64 are present (Their inclusion, as was mentioned hereinbefore, is optional for use with the confinement-cell window attachment 10), the observer is free to urge the viewing lens 60 into any desired position along the longitudinal length of the slots 62, 64 for better viewing of conditions in the cell.

If the video camera 48 is present, the battery 50 is inserted to activate the video camera 48 and also the display 46. Not only is the observer able to determine conditions in the cell by looking at the display 46, but a plurality of observers (not shown) can simultaneously watch the display 46, thus enabling all to be better prepared when entry into the cell is required. The video camera 48 can be used in lieu of the viewing lens 60 or in addition to it.

In addition, a video tape record of conditions in the cell prior to entry is obtained. This is useful to demonstrate the necessity for entry, thereby lessening the likelihood that a successful lawsuit can be filed against those responsible for the welfare of the inmate.

The invention has been shown, described, and illustrated in substantial detail with reference to the presently preferred embodiment. It will be understood by those skilled in this art that other and further changes and modifications may be made whithout departing from the spirit and scope of the invention which is defined by the claims appended hereto.

What is claimed is:

1. A confinement-cell window attachment for use at a cell in cooperation with a cell window, comprising:
   (a) a frame enclosure adapted for use with said cell window;
   (b) means for securing said frame enclosure when said frame enclosure is disposed proximate to said cell window;
   (c) means for providing a two-way mirror secured to said frame enclosure and when said frame enclosure is disposed proximate to said cell window, said two-way mirror disposed in parallel planar alignment with respect to said cell window and adapted to permit viewing through said two-way mirror when viewed from the outside of said cell and adapted to prevent viewing through said two-way mirror when viewed from the inside of said cell and wherein said two-way mirror provides at least a five to one reduction in light intensity;
   (d) means for attenuating light disposed in said frame structure and in parallel planar alignment with respect to said two-way mirror and disposed a predetermined distance from said two-way mirror; and
   (e) means for viewing into said cell.

2. The confinement-cell window attachment of claim 1 wherein said means for attenuating light includes a sheet of light attenuating material.

3. The confinement-cell window attachment of claim 2 wherein said sheet of light attenuating material is substantially opaque.

4. A confinement-cell window attachment for use at a cell in cooperation with a cell window, comprising:
   (a) a frame enclosure adapted for use with said cell window;
   (b) means for securing said frame enclosure when said frame enclosure is disposed proximate to said cell window;
   (c) means for providing a two-way mirror secured to said frame enclosure and when said frame enclosure is disposed proximate to said cell window, said two-way mirror disposed in parallel planar alignment with respect to said cell window and adapted to permit viewing through said two-way mirror when viewed from the outside of said cell and adapted to prevent viewing through said two-way mirror when viewed from the inside of said cell;
   (d) means for attenuating light disposed in said frame structure and in parallel planar alignment with respect to said two-way mirror and disposed a predetermined distance from said two-way mirror; and
   (e) means for viewing into said cell wherein said means for viewing includes a viewing lens disposed in an opening through said means for attenuating light.

5. The confinement-cell window attachment of claim 4 wherein said viewing lens includes a detachable lens cover for placing over a portion of said viewing lens that is disposed furthest from said two-way mirror.

6. The confinement-cell window attachment of claim 4 wherein said opening is a slot, said slot having a length that is greater than a width thereof.

7. The confinement-cell window of claim 4 wherein said means for viewing includes a video camera, said camera adapted for viewing through said viewing lens.

8. The confinement-cell window of claim 7 including a display disposed for viewing an image from said video camera at a location that is outside of said cell and wherein said display is attached to said confinement-cell window and is viewable from the outside of said cell by more than one person simultaneously.

9. The confinement-cell window attachment of claim 4 including at least one handle attached to said frame enclosure.

10. The confinement-cell window attachment of claim 4 wherein said frame enclosure includes a non-ferrous material.

11. The confinement-cell window attachment of claim 4 wherein said means for securing includes magnetic means.

12. The confinement-cell window attachment of claim 4 wherein said means for securing includes a first half of a hook and loop type of fastener attached to said frame enclosure and a second half of a hook and loop type of fastener attached proximate to said cell window.

13. A method for viewing an inmate in a cell, which comprises:
   (a) placing a confinement-cell window attachment over a cell window, said window attachment having a two-way mirror proximate said cell window, said two-way mirror being disposed in parallel planar alignment with respect to said cell window and an opaque layer disposed in a frame structure of said window attachment and in parallel planar alignment with respect to said two-way mirror and wherein said opaque layer is disposed a predetermined distance from said two-way mirror and a lens is disposed through said opaque layer for viewing through said two-way mirror and into said cell;
   (b) securing said window attachment proximate to said cell window; and
   (c) looking through said lens.

14. A method for viewing an inmate in a cell, which comprises:
   (a) placing a confinement-cell window attachment over a cell window, said window attachment having a two-way mirror proximate said cell window, said two-way mirror being disposed in parallel planar alignment with respect to said cell window and an opaque layer disposed in a frame structure of said window attachment and in parallel planar alignment with respect to said two-way mirror and wherein said opaque layer is disposed a predetermined distance from said two-way mirror and a video camera that includes a lens attached to said window attachment and wherein said lens is disposed for viewing through an opening in said opaque layer and through said two-way mirror and into said cell;
   (b) displaying an image as perceived by said video camera;
   (c) securing said window attachment proximate said cell window; and
   (d) looking at said image.

15. The method of claim 14 wherein said video camera includes means for recording said image.

16. A method of making a window attachment for monitoring a confinement area, which comprises:

(a) providing a frame structure;

(b) placing a two-way mirror in said frame structure, said two-way mirror being disposed in parallel planar alignment with respect to said frame structure;

(c) placing means for attenuating light in said frame structure proximate said two-way mirror and in parallel planar alignment with respect to said frame structure mirror wherein said means for attenuating includes placing a substantially opaque sheet of material a predetermined distance from said two-way mirror; and (d) placing means for viewing into said confinement area on said window attachment for viewing through said two-way mirror and through said opaque sheet and wherein said means for viewing includes a lens that is disposed in an opening in said opaque material.

17. The method of claim 16 wherein said lens includes attachment to a video camera.

* * * * *